United States Patent
Li

(10) Patent No.: US 7,966,010 B2
(45) Date of Patent: Jun. 21, 2011

(54) METHOD AND SYSTEM FOR TUNING AND SELF-MONITORING OF WIRELESS NETWORKS

(75) Inventor: Aihua Edward Li, Cupertino, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 378 days.

(21) Appl. No.: 12/238,077

(22) Filed: Sep. 25, 2008

(65) Prior Publication Data

US 2010/0075661 A1    Mar. 25, 2010

(51) Int. Cl.
*H04W 24/00*      (2009.01)

(52) U.S. Cl. .................. 455/423; 370/240; 370/338

(58) Field of Classification Search .............. None
See application file for complete search history.

(56) References Cited

U.S. PATENT DOCUMENTS

| | | | |
|---|---|---|---|
| 7,136,638 B2* | 11/2006 | Wacker et al. | 455/424 |
| 2007/0014263 A1* | 1/2007 | Ferrato et al. | 370/335 |
| 2008/0057933 A1* | 3/2008 | Brunner | 455/422.1 |
| 2009/0239569 A1* | 9/2009 | Dottling et al. | 455/522 |

\* cited by examiner

*Primary Examiner* — Ajit Patel

(57) ABSTRACT

A method includes determining a first performance indicator for a wireless network, the first performance indicator including an unperturbed value of a parameter of an access point of the network; perturbing the parameter of the wireless network by a predetermined increment to obtain a perturbed value of the parameter; determining a second performance indicator for the wireless network, the second performance indicator including the perturbed value of the parameter; and selecting the one of the unperturbed value of the parameter and the perturbed value of the parameter corresponding to a higher of the first performance indicator and the second performance indicator.

19 Claims, 2 Drawing Sheets

US 7,966,010 B2

METHOD AND SYSTEM FOR TUNING AND SELF-MONITORING OF WIRELESS NETWORKS

BACKGROUND

Wireless communication networks typically include a number of access points, each with one or more parameters governing their performance. Selection of correct parameter values may help to ensure optimal performance of the network.

SUMMARY OF THE INVENTION

The present application relates to a method comprising determining a first performance indicator for a wireless network, the first performance indicator including an unperturbed value of a parameter of an access point of the network; perturbing the parameter of the wireless network by a predetermined increment to obtain a perturbed value of the parameter; determining a second performance indicator for the wireless network, the second performance indicator including the perturbed value of the parameter; and selecting the one of the unperturbed value of the parameter and the perturbed value of the parameter corresponding to a higher of the first performance indicator and the second performance indicator.

The present application further relates to a system including a plurality of access points and a wireless switch. Each of the access points has a parameter. The wireless switch coordinates the access points; determines a first performance indicator for a wireless network, the first performance indicator including the access points including an unperturbed value of the parameter of a selected one of the access points; instructs the selected one of the access points to perturb its parameter by a predetermined increment to obtain a perturbed value of the parameter; determines a second performance indicator for the wireless network, the second performance indicator including the perturbed value of the parameter; and selects the one of the unperturbed value of the parameter and the perturbed value of the parameter corresponding to a higher of the first performance indicator and the second performance indicator.

The present application further relates to a computer readable storage medium including a set of instructions executable by a processor. The instructions are operable to determine a first performance indicator for a wireless network. The first performance indicator includes an unperturbed value of a parameter of an access point of the network. The instructions are further operable to perturb the parameter of the wireless network by a predetermined increment to obtain a perturbed value of the parameter. The instructions are further operable to determine a second performance indicator for the wireless network. The second performance indicator includes the perturbed value of the parameter. The instructions are further operable to select the one of the unperturbed value of the parameter and the perturbed value of the parameter corresponding to the higher of the first performance indicator and the second performance indicator.

DETAILED DESCRIPTION

Figure 1:
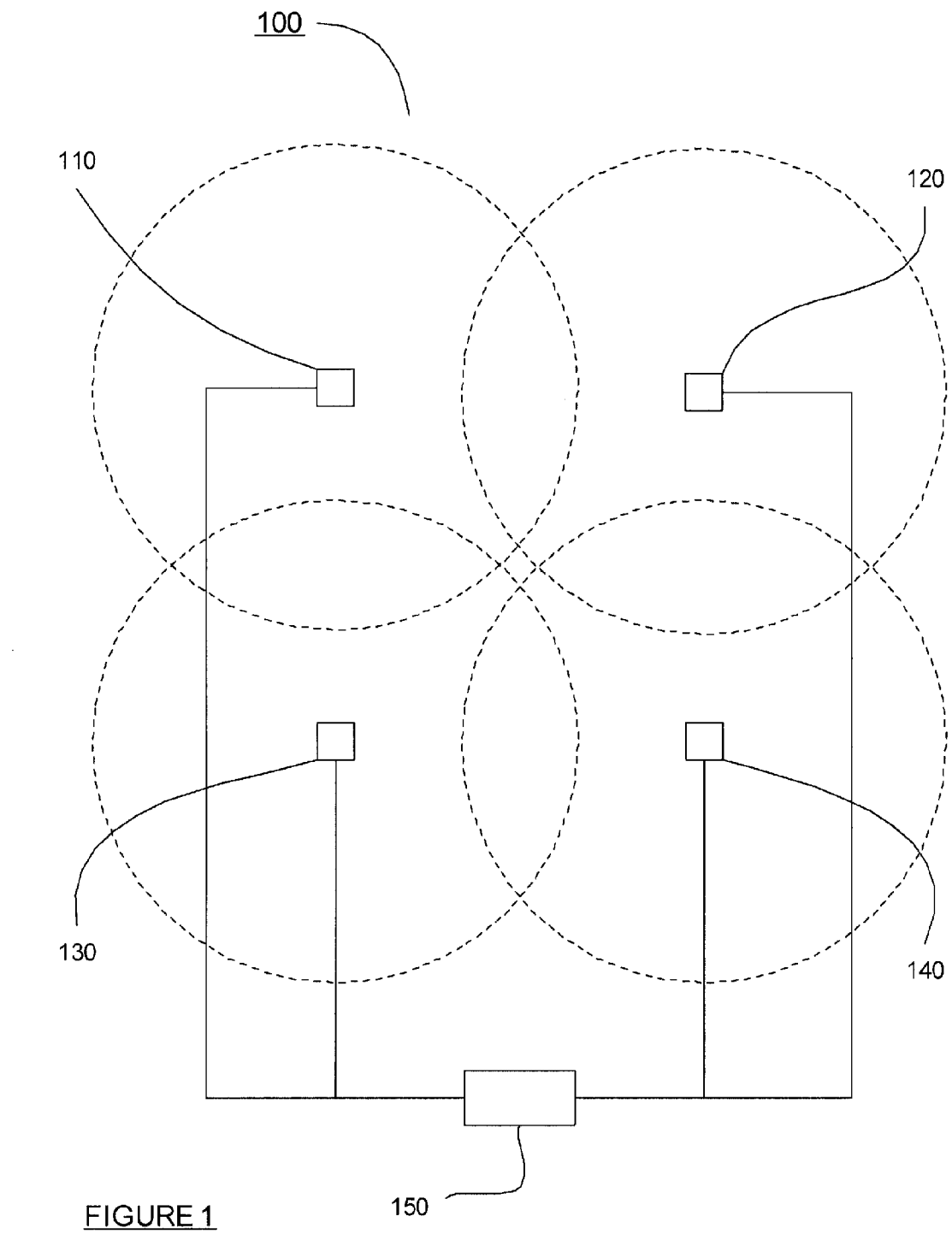
FIG. 1 shows an exemplary wireless network according to the present invention.

The exemplary embodiments of the present invention may be further understood with reference to the following description and the appended drawings, wherein like elements are referred to with the same reference numerals. The exemplary embodiments describe systems and methods for optimizing the ongoing runtime performance of wireless networks. In the exemplary embodiments, a performance indicator is determined for the network, and then monitored during incremental changes in network parameters to determine whether the changes in parameters are beneficial.

It should be noted that in the following exemplary embodiments, the wireless network is described as including access points and the exemplary parameter values and exemplary performance indicators are described for the access points. However, those skilled in the art will understand that the present invention is not limited to application only in wireless networks including access points, nor is it limited to only access points in wireless networks including access points. For example, a wireless network may be deployed using access ports or other types of repeating/routing devices to extend network coverage, and the tuned parameters/performance indicators may apply to these types of devices. However, for the purpose of this description, all of the types of the devices will be referred to as "access points." In another example, the wireless network may include devices such as wireless switches in addition to access points and the tuned parameters/performance indicators may apply to both the access points and the wireless switches.

In order to optimize the performance of wireless networks, it is important to carefully monitor various parameter values of their constituent access points. These parameter values may include channel, power, operating rate set and sensitivity settings. Parameter values may be optimized both at the initiation of network operations and during ongoing operations.

The exemplary embodiments describe the use of a performance indicator to evaluate the performance of a wireless network. Those of skill in the art will understand that many different performance indicators exist, and that the disclosure herein relates to just one of the many potential performance indicators. However, other types of performance indicators may also be used in the exemplary embodiments.

One important factor in optimizing the performance of a network, as measured by an exemplary performance indicator ("P"), is the bit rate ("BR") of each of the N access points in the network. Thus, on the most basic level, P may be defined as:

$$P = \sum_{i=1}^{N} BR_i$$

This indicator, however, fails to consider factors such as the interference among various access points operating on the same channel. Further, it assumes that all access points are constantly busy and handle enough data to sustain such traffic. Realistically, not all access points of a network are constantly busy; this makes the above performance indicator misleading, because a low bit rate may simply occur due to the lack of any data to transmit. Thus, a better performance indicator is desirable to take this into account, and further to consider that if one access point is transmitting on a given channel, other access points may not transmit on the same channel, resulting in waiting time to transmit data. Therefore, an effective bit rate ("E") may be defined in terms of actual transmission time ("$t_{trans}$") and waiting time ("$t_{wait}$") as:

$$E_i = BR * \frac{t_{trans}}{t_{trans} + t_{wait}}$$

The various data used to calculate the effective bit rate may typically be recorded by the access points and collected for aggregation at a central location, such as a network controller. The above formula incorporates $t_{trans}$ into the denominator of the expression in order to smooth the results. For example, if the denominator solely consisted of $t_{wait}$, when there is no waiting time the value of E would become infinite; in contrast, by incorporating $t_{trans}$ into the denominator, when there is no waiting time, the numerator and the denominator are equal and the effective bit rate E is equal to the transmission bit rate BR. The above formula also properly results in a lower performance indicator due to more interference and increased waiting time for each access point. It should be noted that the product of the bit rate BR and the transmission time equals the packet size in bits.

The overall performance indicator P for the network may then be determined by aggregating the effective bit rates E as follows:

$$P = \sum_{i=1}^{N} E_i$$

The above only represents the throughput when the network is constantly receiving and transmitting data. In an exemplary situation where one access point is conducting an FTP operation and another is handling HTTP operations on and off, the former would typically be at its full throughput (the exact speed depending on the particulars of the access point), while the latter would experience very low throughput. Their efficiency would ideally be identical and show good performance, which is a desirable result. However, this fails to consider a situation where one or more access points have no data to transmit. A period when a network is operating at full capacity but does not have data to transmit may be termed a silent period.

If a silent period is short, the network parameters should ideally not change significantly during its duration, and the performance indicator should likewise not change significantly. However, if a silent period is longer, such as if an access point remains unused for a long period of time, the performance indicator should not include that access point. That is to say, the contribution to the overall performance indicator from that access point should be zero. In order to achieve this, a low-pass filtered version F(E) of the effective bit rate E may be used, rather than using E directly. Thus, the performance indicator may be revised to be:

$$P = \sum_{i=1}^{N} F(E_i)$$

A simple exemplary low pass filter has the following difference equation in time domain:

$$y(n) = x(n) + b1 * x(n-1)$$

In this example, n denotes the sample instance, x(n) denotes the input series to the filter and y(n) is the output series from the filter. By assigning fixed values, the physical meaning of this equation can be seen. If b1=1, the output series y is simply the average of the current sample and the last sample multiplied by a factor of two; this equation can be expressed as:

$$y(n) = 2*(x(n) + x(n-1))/2$$

In general, the above will represent a weighted average of the current sample and the previous sample multiplied by a gain factor. For example, if b1=1/3, the output can then be expressed as:

$$y(n) = x(n) + 1/3(n-1)$$
$$= 4/3 * (3/4 * x(n) + 1/4 * x(n-1))$$

The latter expression still represents a weighted average of the input samples, in which more weight is put on the current sample. Such a filter would have a faster response as compared to a simple average form. Those of skill in the art will understand that other, more sophisticated filters are possible.

The faster the filter converges, the more adaptive the exemplary method to be described below may be. Conversely, a filter that converges more slowly may result in an exemplary system that is more resistant to noise. In some exemplary embodiments, the convergence rate of the filter may be user-configurable so that the filter may be adaptable to different situations.

Those of skill in the art will understand that the above discussion merely presents one possible measure of network performance, and that many other measures are possible. For example, the effective bit rate may be replaced by the total throughput (e.g., the sum of uplink throughput and downlink throughput); this relates to user-observable statistics, and considers bi-directional throughput, but is also prone to fluctuation when some mobile units are idle. Alternately, for an implementation wherein it is desirable to minimize power usage of the access points, such power usage U may be incorporated into the performance indicator, such as by the following:

$$P = \sum_{i=1}^{N} F\left(\frac{E_i}{U}\right)$$

In a real deployment scenario, non-overlapping channels are typically chosen for assignment. Since access points operating on non-overlapping channels do not interfere with one another, performance tuning may be done separately on each channel. Therefore, in the following exemplary implementation, it is assumed that all access points are operating on the same channel. The process described below may then be repeated on further operating channels.

FIG. 1 illustrates an exemplary wireless network 100 according to the present invention. The wireless network 100 includes access points 110, 120, 130 and 140. Those of skill in the art will understand that the illustration of four access points is only exemplary, and that other wireless networks may include significantly more access points. Each of the access points may have parameters governing their operation, including, but not limited to, a channel setting and a power setting. These settings may be hardware settings or software settings, and may be modified by any of the various means known in the art. In addition to the access points 110, 120, 130 and 140, the network 100 may include a wireless switch 150 for coordinating the operations of the network 100.

Figure 2:
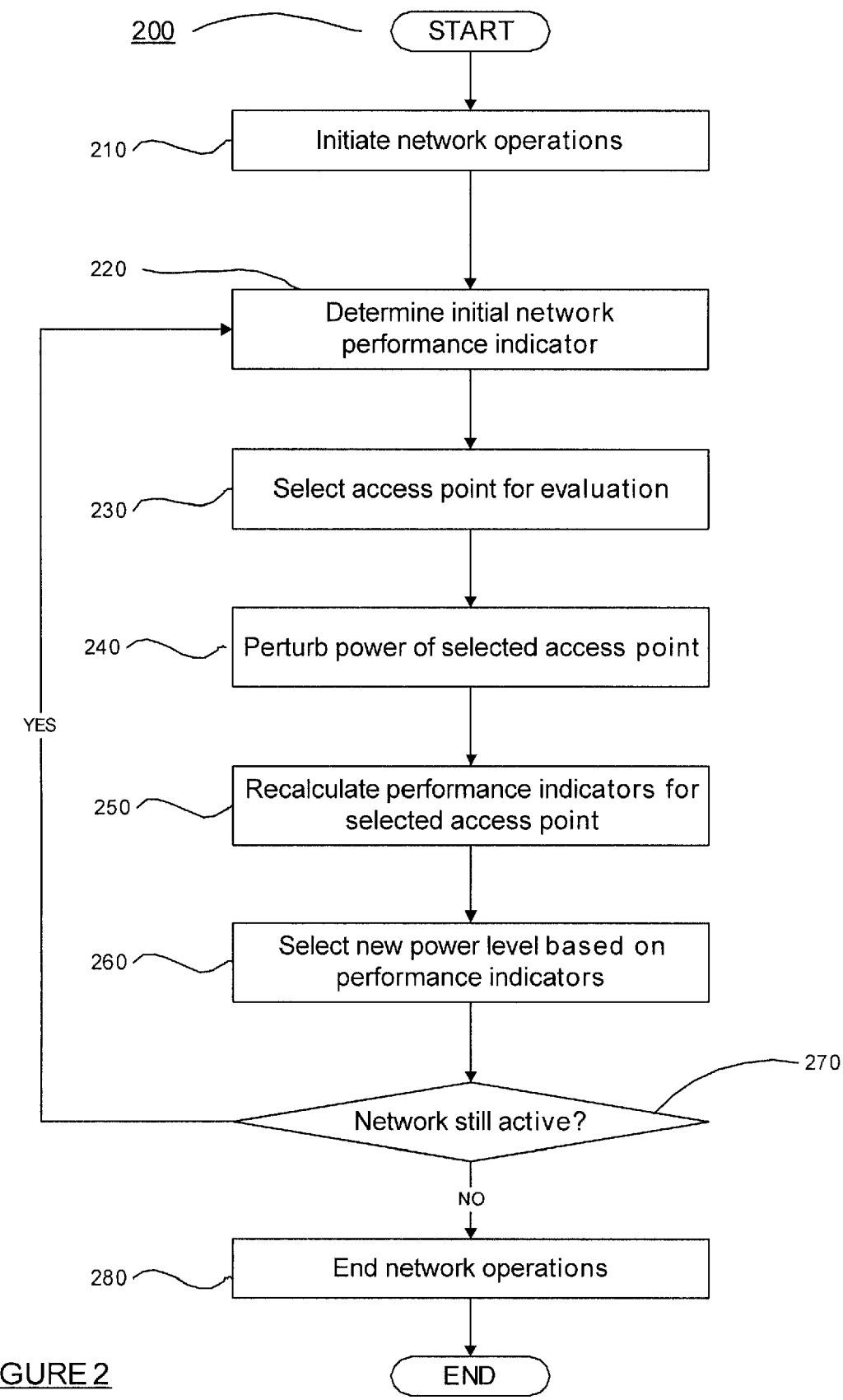
FIG. 2 shows an exemplary method for maintaining wireless network parameter values to optimize performance according to the present invention.

FIG. 2 illustrates an exemplary method 200 for monitoring and optimizing the ongoing performance of a wireless network such as the network 100 of FIG. 1. The exemplary method 200 relates to the monitoring of power settings of each of the access points 110, 120, 130 and 140 in order to maximize performance (e.g., coverage area, data rate, bit rate, etc.) while avoiding interference between signals. Because the signals of access points operating on different channels may generally not interfere with one another, it is assumed that the access points 110, 120, 130 and 140 are operating on the same channel (e.g., WiFi channel 6). Those of skill in the art will understand that larger networks including larger numbers of access points will have access points assigned to various channels; for such networks, the method 200 may be applied separately to each group of access points operating on a single channel. The power settings of the access points 110, 120, 130 and 140 may have been previously initiated by other means for determining optimal initial settings for a wireless network; however, such prior optimization is not required for the operation of the method 200.

In step 210, operations of the network 100 are initiated. This may include powering on components of the network such as the access points 110, 120, 130 and 140, setting up channels, determining initial power settings, etc. Following step 210, the network 100 may be substantially as described above (e.g., access points 110, 120, 130 and 140 are operating on the same channel and have initial power settings determined).

In step 220, a performance indicator for the network 100 is determined. The performance indicator may be one of those described above, or may be another indicator appropriate for a given implementation of the network 100. In step 230, one of the access points (e.g., access point 110) is selected to be evaluated. Each time step 230 is performed, the access point selected for evaluation may change. For example, in subsequent iterations, access point 120 may be selected, then access point 130, then access point 140, then subsequently returning to access point 110. Those of skill in the art will understand that the order in which access points are selected may vary among different embodiments.

In step 240, the transmission power of the selected one of the access points (e.g., access point 110) is perturbed by a small amount both upward and downward. In this exemplary embodiment, the perturbation may be on the order of 1 dBm in either direction, but the size of the perturbation may vary in other embodiments. In step 250, the performance indicator is recalculated for the increased and decreased transmission power applied in step 230. In step 260, the performance indicators for the upwards and downwards perturbed transmission power for the selected access point are compared to the original performance indicator, and the one of the three transmission powers (original, perturbed upwards, perturbed downwards) that results in the highest performance indicator is retained.

In step 270, the status of the network is determined. While the network remains active, the method continually returns to step 220, where the above-described process is repeated to continue the process of tuning the performance of the network. Otherwise, network operations are terminated in 280, and the method terminates.

The above-described exemplary embodiment makes the assumption that the value of the performance indicator is a parabolic function of its input variables, and that there is a unique optimal point at which the highest value of the performance indicator may be achieved. By making slight adjustments to the input variables in the manner described above, or by retaining prior values if they are found not to be improved by those slight adjustments, this optimal set of input variables may be arrived at.

It should be noted that the perturbing of the power of the access point is only exemplary and that other parameters such as channel, sensitivity settings, operating rate set, etc. may be perturbed to continuously tune the network. It is further noted that the method 200 may be carried out on a continuous basis during network operations because the network may experience various transient or permanent changes during operation, such as the number of mobile devices in the area, the introduction of obstructions, various types of electrical interferences, etc. Thus, the continuous self-tuning may be used to adjust the network to compensate for such changes.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A method, comprising:
    determining a first performance indicator for a wireless network including an unperturbed value of a parameter of an access point of the network;
    perturbing the parameter of the wireless network by a predetermined amount to obtain a perturbed value of the parameter;
    determining a second performance indicator for the wireless network including the perturbed value of the parameter; and
    selecting the one of the unperturbed value of the parameter and the perturbed value of the parameter corresponding to a higher of the first performance indicator and the second performance indicator.

2. The method of claim 1, wherein the parameter is a transmission power of an access point of the wireless network.

3. The method of claim 1, wherein the predetermined amount is 1 dBm.

4. The method of claim 1, wherein the parameter is one of increased and decreased by the predetermined amount.

5. The method of claim 1, wherein the performance indicator is based on a bit rate of each of a plurality of access points of the network.

6. The method of claim 5, wherein the performance indicator is a sum of effective bit rates of the access points.

7. The method of claim 6, wherein the effective bit rate is a packet size divided by an effective transmission time.

8. The method of claim 7, wherein the effective transmission time is the sum of an actual transmission time and a waiting time.

9. The method of claim 1, wherein the first performance indicator and the second performance indicator are determined by a wireless switch of the wireless network.

10. The method of claim 1, wherein the first performance indicator and the second performance indicator include a filtered effective bit rate.

11. A system, comprising:
    a plurality of access points, each of the access points having a parameter; and
    a wireless switch coordinating the access points, the switch determining a first performance indicator for a wireless network including the access points including an unperturbed value of the parameter of a selected one of the access points, the wireless switch further instructing the selected one of the access points to perturb its parameter by a predetermined amount to obtain a perturbed value of the parameter, the wireless switch further determining a second performance indicator for the wireless network including the perturbed value of the parameter, the wireless switch further selecting the one of the unperturbed value of the parameter and the perturbed value of the parameter corresponding to a higher of the first performance indicator and the second performance indicator.

12. The system of claim 11, wherein the parameter is a transmission power.

13. The system of claim 11, wherein the predetermined amount is 1 dBm.

14. The system of claim 11, wherein the parameter of the selected one of the access points is one of increased and decreased by the predetermined amount.

15. The system of claim 11, wherein the performance indicator is based on a bit rate of each of the access points.

16. The system of claim 15, wherein the performance indicator is a sum of effective bit rates of each of the access points.

17. The system of claim 16, wherein the effective bit rate of each of the access points is a packet size divided by an effective transmission time.

18. The system of claim 17, wherein the effective transmission time is the sum of an actual transmission time and a waiting time.

19. The system of claim 11, wherein the first performance indicator and the second performance indicator include a filtered effective bit rate.

* * * * *